United States Patent [19]

Feilhauer

[11] Patent Number: 4,581,681
[45] Date of Patent: Apr. 8, 1986

[54] SOLID ELECTROLYTIC CAPACITOR

[75] Inventor: Rudolf Feilhauer, Zöschingen, Fed. Rep. of Germany

[73] Assignee: Siemens Aktiengesellschaft, Berlin and München, Fed. Rep. of Germany

[21] Appl. No.: 545,065

[22] Filed: Oct. 25, 1983

[30] Foreign Application Priority Data

Oct. 29, 1982 [DE] Fed. Rep. of Germany ....... 3240194

[51] Int. Cl.⁴ .............................................. H01G 9/00
[52] U.S. Cl. .................................... 361/433; 361/275
[58] Field of Search .............. 361/433, 275, 272, 278; 29/570; 337/292

[56] References Cited

U.S. PATENT DOCUMENTS

| | | | |
|---|---|---|---|
| 4,107,762 | 8/1978 | Shirn et al. | 361/26 |
| 4,121,277 | 10/1978 | Hilbert | 361/433 |
| 4,150,419 | 4/1979 | Epple et al. | 361/275 |
| 4,224,656 | 9/1980 | DeMatos et al. | 29/570 X |

FOREIGN PATENT DOCUMENTS

| | | |
|---|---|---|
| 2531438 | 1/1977 | Fed. Rep. of Germany . |
| 2638611 | 3/1978 | Fed. Rep. of Germany . |
| 1447982 | 9/1976 | United Kingdom . |

Primary Examiner—L. T. Hix
Assistant Examiner—Douglas S. Lee
Attorney, Agent, or Firm—Herbert L. Lerner; Laurence A. Greenberg

[57] ABSTRACT

A solid electrolytic capacitor formed of a thermoset plastic casing enclosing a sintered anode of a valve metal, an oxide layer disposed on the anode as a dielectric, a semiconductive electrolyte on the oxide layer as a cathode, a cathode contacting layer on the electrolyte, an anode terminal connected to the anode and a cathode terminal spaced from the cathode contacting layer a distance bridged by a metal alloy serving as a safety fuse, includes a thin layer of a wax-like substance surrounding the metal-alloy safety fuse, the wax-like substance having a melting temperature below, equal or little above the melting temperature of the metal alloy.

3 Claims, 1 Drawing Figure

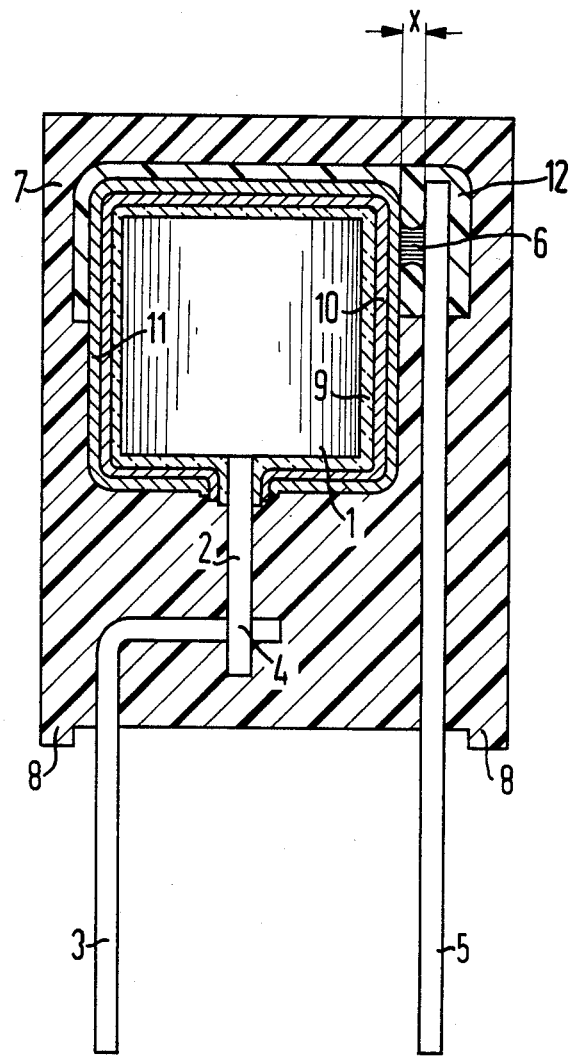

SOLID ELECTROLYTIC CAPACITOR

The invention relates to a solid electrolytic capacitor formed of a thermoset plastic casing enclosing a sintered anode of valve metal, an oxide layer disposed on the anode as a dielectric, a semiconductive electrolyte on the oxide layer as a cathode, a cathode contacting layer on the electrolyte, an anode terminal connected to the anode and a cathode terminal spaced from the cathode contacting layer a distance bridged by a metal alloy serving as a safety fuse.

Such a capacitor is known from U.S. Pat. No. 4,121,277. In such capacitors, tantalum is mainly used as the valve metal from which a sintered anode is made. On this anode, an oxide layer serving as a dielectric is produced by a forming process; semiconductive manganese dioxide is primarily used as the cathode. A contact arrangement formed by a graphite layer and a metal layer disposed thereon, for example, a copper or silver layer of conductive varnish, is applied to the manganese dioxide layer.

Such capacitors are polarized components i.e. they block the current only in one direction. If they are poled wrong, the danger exists that the applied voltage will be discharged in short-circuit manner, in which case the sintered anode may burn up and the capacitor may be destroyed explosively. If such capacitors are thus arranged on circuit boards, this can have detrimental consequences for the adjacent components because the latter may likewise be destroyed by the intense heat. There exists the further danger that the entire circuit board may be set on fire and the equipment furnished with the circuit board thereby destroyed.

To eliminate these difficulties, the capacitor described at the introduction hereto has a space located between the cathode terminal and the contacting layer, that space being bridged by a metal alloy which serves as a safety fuse. The melting point of the safety fuse must be selected so that the casing of the thermoset plastic material cannot be set on fire or burned through. Preferably, a solder metal with a melting point below 200° C. is therefore used, for example, $Sn_{60}PbAg$, which has a melting point within the temperature range of 180° to 190° C.

In case of trouble, for example, the occurrence of a short circuit, the sintered body is first heated by the high current load, whereby the safety fuse is also heated up. The metal alloy melts i.e. is liquefied, and, due to the spacing between the contact surfaces, an interruption between the cathode terminal and the cathode contacting layer occurs. In the event of such trouble which causes the fuse to melt, the capacitor can thus not be heated by the short circuit current to an extent that it is set on fire and damages the other components or the equipment.

In the hereinafore-described operation, however, it is presupposed that fine cracks or fissures are produced in the thermoset plastic casing by the thermal expansion during the heating-up process, those cracks serving as a shunt for the liquid solder and ensuring a reliable current interruption. Until the casing bursts, however, the liquid solder continues to conduct current so that no interruption takes plate at first. As measurements have shown, the casing bursts only when the currents are so high as to be in the order of magnitude of 10 A and after periods of time of up to 2 minutes have elapsed. In addition, the danger exists that the out-flowing solder metal may cause further short circuits on the circuit boards.

It is therefore an object of the invention to provide a solid electrolytic capacitor which is reliably shut off even for relatively low short-circuit currents and with which there is no danger that short circuits might occur on circuit boards due to outflowing solder metal.

With the foregoing and other objects in view, there is provided, in accordance with the invention, a solid electrolytic capacitor formed of a thermoset plastic casing enclosing a sintered anode of valve metal, an oxide layer disposed on the anode as a dielectric, a semiconductive electrolyte on the oxide layer as a cathode, a cathode contacting layer on the electrolyte, an anode terminal connected to the anode and a cathode terminal spaced from the cathode contacting layer a distance bridged by a metal alloy serving as a safety fuse, comprising a thin layer of a wax-like substance surrounding the metal-alloy safety fuse, the wax-like substance having a melting temperature below, equal or little above the melting temperature of the metal alloy.

In accordance with another feature of the invention, the wax-like substance is formed of a synthetic wax.

In accordance with a further feature of the invention the synthetic wax is formed of amorphous polypropylene.

An advantage of the capacitor according to the invention is that the wax-like substance is already liquefied when heated to a temperature which is yet below, equal or little above the melting temperature of the metal alloy. In the event of a short circuit, the melted solder can then form melted beads in the liquid wax, whereby the flow of the current becomes interrupted without any necessity for the solder metal to escape from the casing or enclosure formed of plastic material. Should the casing of plastic material burst nevertheless, or have fine hair-like cracks formed therein due to improper handling, the solder metal escapes from the casing in the form of very small droplets and is embedded in the wax. When the wax reaches the surface of the casing, it solidifies rapidly, so that secondary short circuits are prevented also in this case. The polypropylene forms bubbles upon escaping, which means that the polypropylene or any softener contained therein is overheated when melted and breaks the casing formed of plastic material open as a result of the vapor pressure which is generated. If the polypropylene escapes before the metal alloy is melted, which can also happen, for example, due to hair-like cracks present in the casing, additional empty space is provided to the later-melting solder for forming the melt beads.

Other features which are considered as characteristic for the invention are set forth in the appended claims.

Although the invention is illustrated and described herein as embodied in a solid electrolytic capacitor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a sectional view of a solid electrolytic capacitor according to the invention.

Referring now to the FIGURE of the drawing, there is shown therein a sintered anode 1 formed of a valve metal such as tantalum, for example, with which contact is made by an anode terminal 2 which is likewise formed of tantalum. An outer anode terminal element 3 formed, for example, of a tinned nickel wire, is welded to the anode terminal 2 at the point 4. It is further shown diagrammatically in the drawing that a dielectric oxide layer 9 is arranged on the sintered anode 1, and a semiconductive electrolyte 10 serving as a cathode is disposed on the oxide layer 9. This electrolyte 10, which is formed, for example, of manganese dioxide, is provided with a cathode contact arrangement or contacting layers 11 formed of a graphite layer and a metal layer disposed thereon. The metal layer may be, for example, conductive varnish film of copper or silver. A tinned nickel wire may serve as the cathode terminal 5. Between the cathode terminal 5 and the cathode contacting layers 11, a spacing is provided which is bridged by a safety fuse 6. The width of the spacing x depends upon the diameter of the sintered body 1 which is used and is, for example, preferably 0.5 mm for a sintered anode 1 having a diameter of 4.5 mm. As mentioned hereinbefore, the material of which the metallic safety fuse 6 is formed must be chosen so that the casing 7 which is formed of a thermoset plastic material, for example, an epoxy resin, cannot be set on fire or burned through. Preferably, a solder metal with a melting point below 200° C. is therefore used, for example, $Sn_{60}PbAg$ according to German Engineering Norm (DIN) 1707, which consists of from 59.5 to 60.5% Sn, and 3.0 to 4.0% Ag as well as Pb, and has a melting point within the temperature range between 180° and 190° C.

In the embodiment illustrated in this figure, spacer feet 8 are provided on the underside of the casing 7.

The safety fuse 6 is surrounded by a thin layer of a wax-like substance 12, for example, amorphous polypropylene. For producing the layer 12, the capacitor assembly is immersed to such a depth in melted amorphous polypropylene, before the casing 7 is formed, that the safety fuse 6 is wetted. After the polypropylene has cooled down, the capacitor is provided with the casing 7 formed of thermoplastic material.

To check the interrupting behavior, solid electrolytic capacitors according to the invention and, for the purpose of comparision, capacitors without the thin wax-like film in the vicinity of the safety fuse were soldered into boards and loaded with wrong polarization (so that a short circuit is produced), the loading being with a current having an increasing rate of 4 A/min. With the capacitors according to the invention, the interruption fuse responded, even at currents below 2 A (interruption current $1.72 \pm 0.12$ A), 100 percent of the time i.e. in all capacitors, while in the reference capacitors according to the heretofore known state of the art, a short-circuit current of 5 A flowed for 10 seconds in 80% of the cases without any interruption of the current by the safety fuse.

The capacitors according to the invention are therefore distinguished by the feature that rapid and reliable interruption occurs even in the event of a short circuit due to wrong polarity without any resultant detrimental consequences. It should be emphasized that, in all the capacitors according to the invention, polypropylene had escaped through the casing, and only in one case did a small amount of solder escape at the same time; however, the droplets of escaped solder were embedded in the polypropylene. Heating of the sintered bodies to incandescence or burning of the casings formed of plastic material occurred in none of the capacitors according to the invention.

The foregoing is a description corresponding in substance to German Application No. P 32 40 194.9, dated Oct. 29, 1982, the International priority of which is being claimed for the instant application, and which is hereby made part of this application. Any material discrepancies between the foregoing specification and the aforementioned corresponding German application are to be resolved in favor of the latter.

I claim:

1. Solid electrolytic capacitor formed of a thermoset plastic casing enclosing a sintered anode of valve metal, an oxide layer disposed on the anode as a dielectric, a semiconductive electrolyte on the oxide layer as a cathode, a cathode contacting layer on the electrolyte, and anode terminal connected to the anode and a cathode terminal spaced from the cathode contacting layer a distance bridged by a metal alloy serving as a safety fuse, comprising a thin layer of a wax-like substance surrounding the metal-alloy safety fuse, said wax-like substance having a melting temperature below, equal or little above the melting temperature of the metal alloy.

2. Solid electrolytic capacitor according to claim 1, wherein said wax-like substance is formed of a synthetic wax.

3. Solid electrolytic capacitor according to claim 2, wherein said synthetic wax is formed of amorphous polypropylene.

* * * * *